United States Patent Office 3,211,973
Patented Oct. 12, 1965

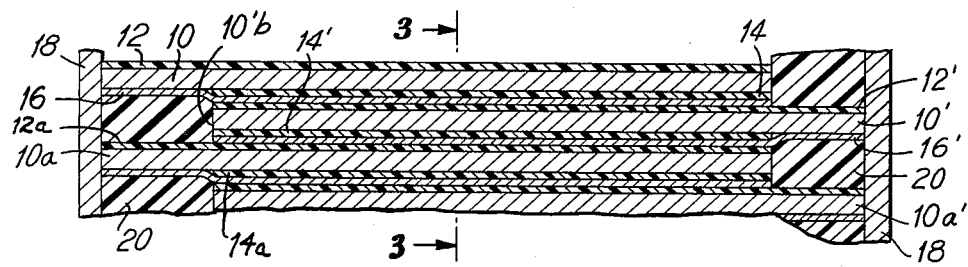
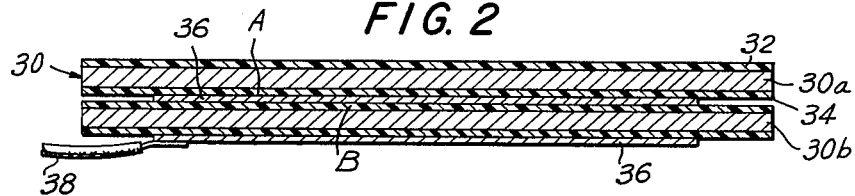
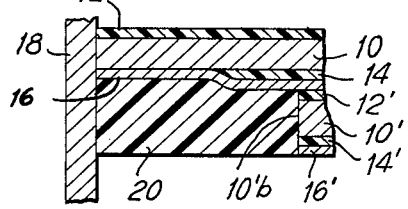
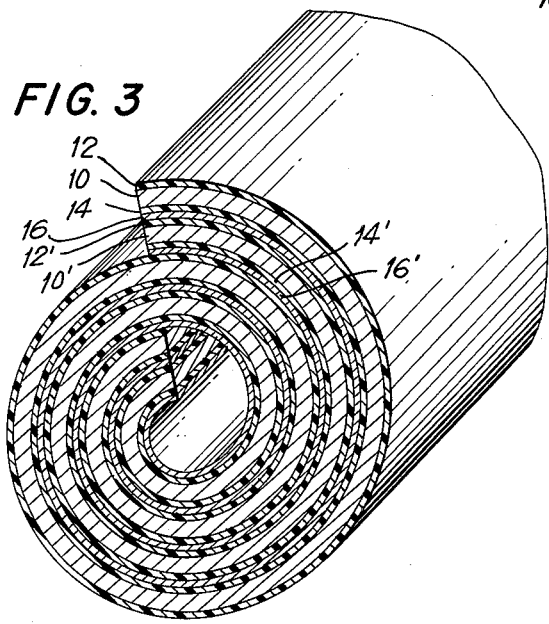
INVENTOR
JOSEPH F. FERRANTE
BY Paul S. Martin
ATTORNEY

3,211,973
DIELECTRIC-COATED FOIL CAPACITORS
Joseph F. Ferrante, Westwood, Mass., assignor to Cornell-Dubilier Electric Corporation, a corporation of Delaware
Filed Oct. 6, 1960, Ser. No. 61,002
7 Claims. (Cl. 317—260)

The present invention relates to electrostatic condensers employing metal foil as an electrode or armature.

In the manufacture of condensers, particularly the type of condenser employing wound metal-foil electrodes with interposed layers of dielectric material, it has been proposed to apply an insulating coating to the foil as the dielectric. This has the advantage of making possible the use of extremely thin dielectric layers between the electrodes, thinner than self-supporting strips of dielectric such as paper or various plastics. It also makes possible the use of varied dielectric materials that are not readily prepared in strip form.

If two dielectric-coated metal foils are wound together, a capacitor of elemental form is produced. However, the difficulty arises that, if there should be a flaw in the dielectric coating of either foil at any place in the entire unit, the condenser fails and must be rejected.

It is accordingly an object of the present invention to provide a novel form of condenser of the type utilizing foil electrodes bearing adherent coatings. More specifically, it is an object of this invention to provide a novel coated-foil condenser that is self-healing, so that one or more localized flaws or defects that otherwise might cause breakdown can be cleared.

The nature of the invention will be understood from the detail description which appears below of two illustrative embodiments of the invention shown in the accompanying drawings. Briefly, each metal-foil electrode is coated on both of its surfaces with suitable dielectric material. When two such metal-foil electrodes are assembled to each other, usually in the form of wound convolutions, one dielectric layer is exposed to the opposed dielectric layer of the next adjoining electrode. One of those coatings, pursuant to the present invention, has a metallized coating thereon. In one embodiment of the invention, the metallized coating is electrically connected to the foil. In this form, the dielectric layer which coats that electrode and supports the metallized film is provided for the sole purpose of achieving the self-healing property, and it is not active in contributing capacitance. The resulting capacitance is due to the coating of dielectric material between the metallized film on one electrode and the other foil that bears this coating. It may be of minimum thickness for maximum capacitance or it may be thicker for higher voltage ratings; and in any event, it is self-healing. In a second form, the metallized layer is not connected to these supporting foils, and it constitutes an electrode of the capacitor. In the latter instance, both dielectric coatings are active in contributing to the capacitance of the condenser. In the first embodiment, a two-electrode condenser uses two foil electrodes whereas in the latter, only one foil electrode is required, the metallized film constituting the other electrode.

Further objects and specific aspects of the invention and the features of novelty will be recognized in the following detailed description of the illustrative embodiments. In this description, reference is made to the accompanying drawings, wherein:

FIGURE 1 is an enlarged cross-section of an elemental portion of a wound capacitor embodying certain aspects of the present invention;

FIGURE 1a is a greatly enlarged view of a portion of FIGURE 1;

FIGURE 2 is the enlarged cross-section of an elementary portion of another wound capacitor embodying further aspects of the present invention; and FIGURE 3 is a sectional view of the embodiments of FIGURE 1 taken along the line 3—3 of FIGURE 1.

In the embodiment of the invention shown in FIGURE 1, a first metal-foil 10 has an adherent coating 12 of dielectric material. This may be of lacquer or any one of numerous plastics having desirable dielectric properties, and foil 10 similarly has a coating 14 on its opposite face of the same insulation or of another material which should be an insulator and need not have any special merit as a dielectric. A marginal area of metal foil 10 is left free of dielectric coating 14, at the left-hand edge in FIGURE 1. A metallized film 16, advantageously deposited in vacuum by well-known vapor-depositing techniques, covers dielectric layer 14, and film 16 extends to the uncoated margin of foil 10 so as to be adherent and electrically connected to this foil. Another electrode 10' is formed in exactly the same manner as electrode 10, including dielectric coating 12' which covers electrode 10', insulating coating 14' which leaves a marginal area of foil 10' free of coating, and a metallized film 16' that covers coating 14' and extends onto the metal foil 10' in the marginal area at the right-hand edge in the drawing. Foils 10 and 10' are elongated strips, viewed in transverse cross-section in the drawing. They are wound together so that metallized film 16 of electrode 10 is in face-to-face contact with dielectric coating 12' of foil 10'. A second convolution of foil 10 is designated 10a, and similarly second convolution of foil 10' is designated at 10a'. In each instance, one of the metallized films 16, 16' is disposed against the dielectric coating 12' or 12 of the next adjacent electrode (naturally with the exceptions of the innermost and outermost convolutions of the wound condenser).

As shown in the drawings, the convolutions 10, 10a, etc. of one electrode project to the left and similarly the convolutions of the other electrode 10', 10a', etc. project at the right-hand end of the wound unit. These convolutions are conveniently joined together by respective metal end terminals 18 and 18'. The terminals may be mechanically applied or they may be solder terminals, in any conventional form. The end space between the projecting convolutions is filled with an insulating liquid of solid material, which may advantageously be oil or wax or an insulation that is polymerized in situ, and this insulation may also extend as an impregnation filling any voids otherwise present between each convolution and the next adjacent convolution. The insulation is commonly provided by vacuum-impregnation.

It is possible that a localized flaw such as a pin-hole or a metallic particle might be present in one of the coatings 12 or 12'. If this should prove to be the case, and if voltage is applied between the electrodes 10 and 10', then breakdown may be expected between one of the foils 10 or 10' and the metallized film 16 or 16' of the adjoining electrode. The current that flows causes the metallized film 16 to vaporize in the immediate region of the flaw, where the current is concentrated. The film is destroyed and disappears as a conductor in that region, and the condenser is healed. This may take place during the winding of the capacitor, and it occurs in the finished condsenser when in use.

It may be noted that the edge of each electrode is offset from the edge of the electrode opposite it by a substantial margin, which is greater than the marginal portion of metallized film 16 in contact with the electrode 10. Thus, referring to FIG. 1a foil 10' has its edge 10'b offset to the right somewhat further than the left-hand extremity of coating 14. For this reason, if any breakdown should occur between foil 10' and metallized film 16 where the breakdown by-passes dielectric coating 12′, the metallized layer is nonetheless effective to clear the breakdown. Normally, the dielectric impregnating material 20 prevents any such end-breakdown in the finished condenser.

Referring to FIGS. 1 and 3, the capacitance of this capacitor is represented by the dielectric 12′ which separates the metal foil 10′ and the opposed active electrode 16 and by the dielectric 12a that separates the metal foil 10a and the opposed active layer 16′. Thus, the dielectric layers 14, 14′ are ineffectual to contribute to the capacitance of the unit. However, dielectric layers 12′, 12a when formed as a coating can be extremely thin, considerably thinner than separate self-supporting strips of insulations such as paper or commonly used plastics. In this way, large values of capacitance can be built up with a relatively modest area of foil.

In another embodiment of the invention, the metallized film is not connected to the base foil and in that embodiment of the invention, the metallized film can be used as a separate electrode opposite the metal foil. In this instance, a single coated and metallized foil may be employed in making a wound capacitor. This is illustrated in FIGURE 2 wherein metal foil 30 has coatings 32 and 34 on its opposite faces. These coatings are adherent and cover both surfaces of the metal-foil, and both are selected for desirable properties as a dielectric. A metallizing film as of zinc or aluminum or any other suitable vapor-deposited metal 36 is adherent to coating 34. Metallized film 36 is "margined" that is, the lateral extent of the metallized film is less than the full width of the foil so as to insure adequate insulation from the edges of foil 30 to the edges of the metallized coating 36.

Multiple convolutions of foil 30 are present in the whole wound condsenser, only two such convolutions 30a and 30b being illustrated. Connection is readily made to foil 30 at the edge extremities, and by like token, connection is made to film 36 at convenient points by means of an interposed "flag" as of foil 38 whose lateral faces are insulated except where such flag 38 is in contact (electrically and mechanically) with metallized film 36.

In the embodiment of FIGURE 2, flaws and consequent breakdowns may occur between electrode 36 and electrode foil 30. Upon application of treating or operating potential, the metallized film vaporizes in the region of a flaw A between metallized film 36 and the upper convolution 30a of the foil electrode illustrated or at flaw B between the metallized film 36 and the next lower convolution 30b.

In this embodiment, the capacitance of the unit is that due to the active dielectric layers 32 and 34 which are interposed between successive convolutions of the foil 30 and the metallized film 36. The metallized film 36 is adherent to one dielectric layer 34; and it is in mechanical contact with the opposite dielectric layer 32. Any voids that might be present between metallized film 36 and the opposed dielectric layer 32 are filled with a suitable impregnation of wax, oil, or any other well-known impregnating insulating material.

The foregoing detailed description involves two embodiments of the present invention promoting effective use of dielectric coatings on foil in a self-healing condsenser. It will be recognized that those skilled in the art will readily be able to apply the novel concepts involved in modified forms and in varied applications as, for example, in flat laminated capacitors rather than the wound capacitors discussed. Consequently, the present invention should be broadly construed in accordance with its full spirit and scope.

Having thus described my invention, what I claim is new and desire to secure by Letters Patent is:

1. A capacitor component including an electrode of metal foil, adherent dielectric coatings on the opposite faces thereof, one of said coatings being of lesser extent than said foil so as to have a limited marginal portion of the foil free of dielectric coating material, and a metallized film covering and adherent to said one coating and extending to and connected electrically with said marginal portion of said foil.

2. A wound capacitor including two superposed wound metal-foil electrodes having the successive convolutions thereof confronting each other, each of said convolutions having first and second dielectric coatings on the opposite faces thereof, respectively and a metallized film adhered to only said first coating of each electrode and in contact with said second dielectric coating of the other electrode.

3. A capacitor including plural superposed electrodes of metal foil, adherent coatings of dielectric material on the opposite surfaces of each of said electrodes of metal foil, one coating of each electrode extending over only part of the foil so as to have a marginal portion of the metal foil free of dielectric coating, and an adherent metallized film covering said one coating of each electrode and extending into contact with said free marginal portion of each said metal foil, the other coating of each metal foil being exposed, and the metallized film on one such electrode being in confronting surface contact with the exposed dielectric coating of the next electrode of said superposed electrodes.

4. A capacitor including plural superposed layers, each layer including an electrode of metal foil, adherent coatings of dielectric material covering the opposite surfaces of the metal-foil of said layer, and an adherent metallized film covering one of said coatings to an extent less than said one coating so as to leave limited portions along the marginal edges of said one coating free of metallized film, and the metallized film of each said layer being in confronting surface contact with the dielectric coating of the next electrode of said superposed layers.

5. A capacitor winding having a succession of convolutions and including an electrode of metal foil, adherent dielectric coatings on opposite faces of said foil, and a metallized film on and adherent to one of said coatings, the other of said coatings being exposed to and directly engaging the succeeding convolution in the winding.

6. A capacitor winding including a convolutely wound strip of metal foil having first and second dielectric coatings adherent respectively, to the opposite surfaces thereof and a metallized film on said first dielectric coating and everywhere insulated by said first coating from said foil, said metallized film being in confronting surface contact with said second dielectric coating, said foil having means providing a terminal connection thereto and said film having different means providing a connection thereto insulated from said first terminal connection and from said foil.

7. A capacitor in accordance with claim 3 wherein the successive electrodes are laterally offset alternately so that each said marginal portion and its metallized film is out of confronting relation to the next one of said superposed electrodes, the offset being greater in extent than said marginal portion.

References Cited by the Examiner

UNITED STATES PATENTS

| | | | |
|---|---|---|---|
| 2,408,910 | 10/46 | Burnham | 317—258 |
| 2,728,036 | 12/55 | Steiner et al. | 317—261 |
| 3,012,176 | 12/61 | Williams et al. | 317—261 |

FOREIGN PATENTS

| | | |
|---|---|---|
| 1,058,368 | 11/53 | France. |
| 754,574 | 1/53 | Germany. |

LARAMIE E. ASKIN, *Primary Examiner.*

SAMUEL BERNSTEIN, JOHN F. BURNS, *Examiners.*